Patented Aug. 31, 1954

UNITED STATES PATENT OFFICE 2,687,940

DYESTUFF FOR HYDROPHOBIC FIBER AND DYED FIBER

Mario Francesco Sartori, Wilmington, Del., assignor to E. I. du Pont de Nemours and Company, Wilmington, Del., a corporation of Delaware No Drawing. Application June 10, 1952, Serial No. 292,738

4 Claims. (Cl. 8—55)

This invention relates to a new coloring matter useful for dyeing hydrophobic textile fibers in red shades. More particularly, this invention deals with a novel 2,3,6,8-tetrahalogeno-5-amino-1,4-naphthoquinone, wherein one of the halogens in the 2,3-positions is chlorine, while the remaining three halogens are bromine.

My invention is based on the discovery that this tetrahalogeno compound has the remarkable property of dyeing hydrophobic fibers, such as cellulose acetate, nylon, polyacrylonitrile and polyethylene terephthalate fiber in red shades of good fastness qualities. This quality is of most important practical value, inasmuch as hydrophobic fibers in general, and polyethylene terephthalate fiber in particular, are very selective as to the dyes that can be applied to them.

The dyes heretofore used for dyeing polyester fiber have suffered from a number of defects, among which are (a) lack of affinity for the fiber, which results in poor efficiency of dyeing and inability to get heavy shades of color, (b) lack of wash-fastness, (c) lack of light-fastness, and (d) tendency to form insoluble tars during the dyeing process, which damage the fabric. Even some dyes that have heretofore been used with good results upon cellulose acetate have not proven satisfactory when applied to polyester fibers.

It is therefore surprising and gratifying that the novel compound of this invention has great affinity for polyester fiber and produces dyeings of excellent wash fastness and light fastness.

I prepare my novel compound by subjecting 5-amino-2,3-dichloro-1,4-naphthoquinone to relatively intense bromination, for instance by the aid of bromine in acetic acid solution at steam bath temperature. This process introduces two bromine atoms in positions 6,8 and further replaces by bromine one of the initial chlorine atoms. Consequently, the product may be expressed by the formula

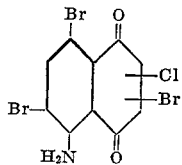

It is not known which of the two chlorine atoms is replaced. It may well be that the product is a mixture of two compounds differing merely in the relative positions of the 2,3-halogen atoms.

Without limiting my invention, the following examples are given to illustrate my preferred mode of operation. Parts mentioned are by weight.

Into a flask equipped with an agitator, a thermometer and a reflux condenser were placed 10 parts of 5-amino-2,3-dichloro-1,4-naphthoquinone and 100 parts of glacial acetic acid. To this, 31 parts of bromine dissolved in 20 parts of glacial acetic acid were added. The mixture was heated on a steam bath for 3 hours while agitating. The reaction mass was then poured carefully into 1000 parts of vigorously agitated ice-water. After further agitation for 30 minutes, the brown precipitate was filtered off and washed with cold water until the wash water was acid-free. The precipitate was dried and crystallized from ethyl alcohol. The product was obtained in the form of brown crystals which melted at 248° C. Its carbon, hydrogen and nitrogen analysis agreed well with theory, while its chlorine and bromine analysis indicated that it was essentially a tribromo-monochloro compound.

This product dyes polyethylene terephthalate a bright red color with a blue cast. The dye has a strong affinity for that fiber and both light and heavy shades can be produced. The color so produced is fast to light and to washing. The compound also dyes cellulose acetate, nylon, and acrylonitrile fibers.

My novel coloring matter may be applied to the fiber from an aqueous dispersion, which may or may not contain dyeing assistants, for instance benzoic acid, soap or other dispersing agents.

Dyeing may be achieved at the boiling point of the bath. After agitation of the dyebath, to ensure thorough mixing of the color, the fiber is entered, and the dyebath is kept at about 100° C. for 1 hour. The dye exhausts onto the fiber almost completely. The fabric is then removed and rinsed.

Dyeing may also be carried out under the recently developed high-temperature and pressure processes, and in this system it is of particular advantage that my novel compound is essentially free of sublimation troubles. By this statement is meant that the novel dye does not sublime off the fiber at the temperatures used in these processes, to contaminate the equipment.

I claim as my invention:

1. 2,3,6,8-Tetrahalogeno-5-amino-1,4-naphthoquinone, wherein one of the 2,3-halogens is chlorine, while the remaining halogens are bromine.

2. Hydrophobic fiber dyed with the product compound defined in claim 1.

3. Polyethylene terephthalate fiber dyed with the product compound defined in claim 1.

4. A process for producing a dyestuff material adapted to dye polyethylene terephthalate fiber in red shades, which comprises reacting with bromine, in glacial acetic acid, upon 5-amino-2,3-dichloro-1,4-naphthoquinone.

No references cited.